United States Patent [19]
Karlsson et al.

[11] Patent Number: 5,898,928
[45] Date of Patent: Apr. 27, 1999

[54] ADAPTIVE FREQUENCY ALLOCATION IN A TELECOMMUNICATION SYSTEM

[75] Inventors: Åke Karlsson, ÅKersberga; Daniel Bringby, Huddinge; Patrik Karlsson, Älta; Sverker Magnusson, Stockholm, all of Sweden

[73] Assignee: Telefonaktiebolaget LM Ericsson, Stockholm, Sweden

[21] Appl. No.: 08/609,994

[22] Filed: Feb. 29, 1996

[51] Int. Cl.$^6$ ..................................................... H04Q 7/00
[52] U.S. Cl. ......................... 455/450; 455/450; 455/452; 455/446; 455/447; 455/507; 455/509
[58] Field of Search ................................... 455/452, 451, 455/455, 507, 513, 516, 52.3, 506, 450, 446, 447, 509

[56] References Cited

U.S. PATENT DOCUMENTS

| | | | |
|---|---|---|---|
| 5,287,544 | 2/1994 | Menich et al. | 455/62 |
| 5,491,837 | 2/1996 | Haartsen | 455/62 |
| 5,513,379 | 4/1996 | Benveniste et al. | 455/33.1 |
| 5,517,674 | 5/1996 | Rune | 455/33.2 |
| 5,594,949 | 1/1997 | Andersson et al. | 455/62 |
| 5,606,727 | 2/1997 | Ueda | 455/34.1 |
| 5,625,875 | 4/1997 | Whinnett et al. | 455/53.2 |

FOREIGN PATENT DOCUMENTS

| | | |
|---|---|---|
| 0 522 276 A2 | 1/1993 | European Pat. Off. |
| 0 660 633 A2 | 6/1995 | European Pat. Off. |
| WO 95/22876 | 8/1995 | WIPO |
| WO 95/24810 | 9/1995 | WIPO |

OTHER PUBLICATIONS

M. Almgren et al., "Capacity Enhancements in a TDMA System" IEEE pp. 277–280, 1993.

C. Johansson et al., "Adaptive Frequency Allocation of BCCH Frequencies in GSM" IEEE pp. 107–111, 1995.

"Digital Traffic Channel Structure" EIA/TIA–IS–136.2 Revision A, Published Version, pp. 11–22, 126–132 & 285–286, Mar. 21, 1996.

"PCS IS–136 Based Air Interface Compatibility 1900 Mhz Standard" SP3388–2, ANSI Standard Version, pp. 5–14, 103–110 & 201–202, Apr. 17, 1995.

H. Eriksson, "Capacity Improvement by Adaptive Channel Allocation" IEEE Global Telecomm. Conf., pp. 1355–1359, No. 28–Dec. 1, 1988.

G. Riva, "Performance Analysis of an Improved Dynamic Channel Allocation Scheme for Cellular Mobile Radio Systems" 42nd IEEE Veh. Tech. Conf., pp. 794–797, Denver 1992.

Y. Furuya et al., "Channel Segregation, A Distributed Adaptive Channel Allocation Scheme for Mobile Communication Signals" Second Nordic Seminar on Digital Land Mobile Radio Communication, pp. 311–315, Stockholm Oct. 14–16, 1986.

Primary Examiner—Tommy P. Chin
Assistant Examiner—Anand Rao
Attorney, Agent, or Firm—Burns, Doane, Swecker & Mathis, L.L.P.

[57] ABSTRACT

In a telecommunications network, a method and apparatus for allocating channels makes signal quality measurements for channels that are in use or available for use and for channels that may become available for use. Already selected channels (i.e., channels in use or available for use) that exhibit poor signal quality characteristics are exchanged with candidate channels (i.e., channels that may become available for use) that exhibit better signal quality characteristics to thereby improve the overall signal quality of the network.

32 Claims, 8 Drawing Sheets

ADAPTIVE FREQUENCY ALLOCATION IN A TELECOMMUNICATION SYSTEM

BACKGROUND

The present invention relates to cellular telecommunication systems, and more particularly to the automatic allocation of frequency channels to cells in a cellular telephone system.

In cellular telephone networks, maintaining or improving the speech quality in each communication channel is of great importance. One factor affecting speech quality is the level of co-channel interference. Co-channel interference results when two cells, located close to one another geographically, use the same frequency. One way to avoid this problem is to assign a dedicated group of frequency channels to each cell in the network, so that no two cells utilize the same frequency channel. While this would clearly avoid the problem of co-channel interference, the network would quickly run out of frequency channels since there are only a fixed number of frequency channels available.

To avoid running out of available frequency channels, cellular telephone networks employ reuse plans. Reuse plans allow a network to assign a frequency channel to more than one cell. While some co-channel interference is expected, excessive co-channel interference can be avoided by making sure the two or more frequency channels are located far enough apart.

In general, reuse plans are well known to those of ordinary skill in the art. A fixed reuse plan, as the term suggests, involves the assignment of a fixed, dedicated group of frequency channels to each cell in the network. Frequency channels can be assigned to more than one cell as long as the cells are located far enough apart to avoid excessive co-channel interference.

As previously mentioned, each cell in a network that employs a fixed frequency channel reuse plan will be limited to the specific frequency channels assigned; therefore, the traffic-handling capability for each cell will be limited despite the avoidance of excessive co-channel interference. In other words, fixed reuse plans are inherently inflexible; there is no provision to adjust the frequency channel allocations in each cell as demand fluctuates from cell to cell over the course of a given time period. The result is a degradation in both speech quality and traffic-handling capacity. Therefore, adaptive reuse plans, also known as adaptive channel allocation plans, were conceived.

Adaptive frequency channel reuse plans attempt to avoid the degradation in speech quality and traffic-handling capability by providing greater flexibility. Rather than assigning a fixed group of frequency channels to each cell in the network, allocations will vary over time to meet the changing needs of each cell. The way this is accomplished is by periodically measuring the signal quality for each frequency channel in each cell. As required, cells will have frequency channels allocated as long as the signal quality measurements for the channels meet or exceed certain signal quality criteria. For example, if cell A requires an additional frequency channel to handle an increase in telephone traffic, frequency channel X is not likely to be allocated if it is already being used in a nearby cell. Co-channel interference due to the use of frequency channel X in the nearby cell will be measured in cell A as interference. Thus, frequency channel X will not meet the required signal quality criteria.

There are different types of adaptive channel allocation plans. The primary difference between each plan is the application of criteria used to determine whether a frequency channel should or should not be allocated in a given cell at a given time. For example, H. Eriksson, "Capacity Improvement by Adaptive Channel Allocation", *IEEE Global Telecomm. Conf.*, pp. 1355–1359, Nov. 28–Dec. 1, 1988, suggests using the mobiles to measure the signal quality of the downlink for each channel, then channels are assigned on the basis of those having the highest carrier to interference (C/I) ratios. A somewhat different approach is expressed by G. Riva, "Performance Analysis of an Improved Dynamic Channel Allocation Scheme for Cellular Mobile Radio Systems", *42nd IEEE Veh. Tech. Conf.*, pp. 794–797, Denver 1992, where frequency channels may be allocated if their signal quality measurements meet or exceed a preset C/I threshold. In Y. Furuya et al., "Channel Segregation, A Distributed Adaptive Channel Allocation Scheme for Mobile Communication Signals", *Second Nordic Seminar on Digital Land Mobile Radio Communication*, pp. 311–315, Stockholm, Oct. 14–16, 1986, an adaptive channel allocation plan is described whereby the recent history of signal quality for each channel is measured and used in making channel allocation decisions.

When employing a conventional adaptive channel allocation plan, it is most effective to measure both uplink (i.e., the radio path from the mobile to the base station) and downlink (i.e., the radio path from the base station to the mobile) signal quality for each frequency channel. In digital systems such as D-AMPS (Digital Advanced Mobile Phone System), uplink measurements can be made by equipment located in the base station. Downlink measurements can be made by the mobile assisted handover (MAHO) unit in each mobile; the mobile then transmits the measurements back to the base station.

While adaptive channel allocation strategies provide a more flexible plan which ultimately leads to better signal quality and traffic-handling capacity, planning and frequency allocation is still, for the most part, a manual process. Network operators use elaborate off-line tools, terrain maps, and signal quality measurements, as described above, to manually allocate the most effective frequency channels for each cell. However, this process is quickly becoming unmanageable as more base stations, and cells, are being added per unit area to improve traffic-handling capacity and to meet the demand of an ever increasing number of cellular telephone users. The inability to keep up with the manual allocation of frequency channels eventually causes a degradation in signal quality and traffic-handling capacity; therefore, this manual process is unacceptable. It is thus of great interest to develop algorithms and tools to avoid the difficult and time consuming work necessary for manual frequency planning and allocation. Ideally, base stations should be capable of selecting their own frequencies without manual intervention from the operator and to adapt to a changing radio environment due to the addition of new base stations, cells, geographical obstructions or simply periodic fluctuations in traffic. Therefore, the invention presents an automatic and adaptive frequency allocation system for improving both speech quality and traffic-handling capacity.

SUMMARY

It is an object of the invention to provide a channel allocation strategy that automatically responds to changes in the RF environment, based exclusively on information that is available at the base station of a cell, by automatically selecting those frequency channels which, on the average, exhibit the lowest interference levels.

It is a further object of the invention to provide a channel allocation strategy that responds to changes in the RF environment by automatically exchanging frequency channels that, on the average, exhibit relatively low signal quality with frequency channels that, on the average, exhibit relatively high signal quality.

It is yet another object of the invention to provide a channel allocation strategy that responds to changes in the RF environment by automatically adding and removing frequency channels from use in a cell, when necessary, such that frequency channels remaining in use are those that exhibit, on the average, the highest signal qualities.

In accordance with one aspect of the invention, the foregoing and other objects are achieved in a method and apparatus for allocating frequency channels by measuring the signal quality of both the uplink and downlink for a plurality of selected frequency channels; comparing the measured signal quality of the uplink with that of the downlink for each selected frequency channel; identifying a selected frequency channel from amongst the plurality of selected frequency channels if the downlink signal quality measurement for that frequency channel is worse than the uplink signal quality measurement by at least a predefined amount and the downlink signal quality is less than a pre-defined threshold; identifying a qualified candidate frequency channel and exchanging it with the previously identified selected frequency channel.

In another aspect of the invention, frequency channels are allocated by measuring the signal quality of the uplink and downlink for a plurality of candidate frequency channels; identifying a qualified candidate frequency channel from among the plurality of candidate frequency channels; and allocating the qualified candidate frequency channel to a base station in the telecommunications network. Identifying the qualified candidate frequency channel further involves determining whether the measured downlink signal quality for a candidate frequency channel is not significantly less than the measured uplink signal quality for the candidate frequency channel; determining whether the channel separation between the candidate frequency channel and its nearest selected frequency channel is greater than a pre-defined minimum channel separation requirement; and finally determining whether the candidate frequency channel will, in combination with one or more selected frequency channels, cause third order intermodulation products which are equal to any of the selected channel frequencies other than the selected frequency channel to be exchanged.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Figure 1:
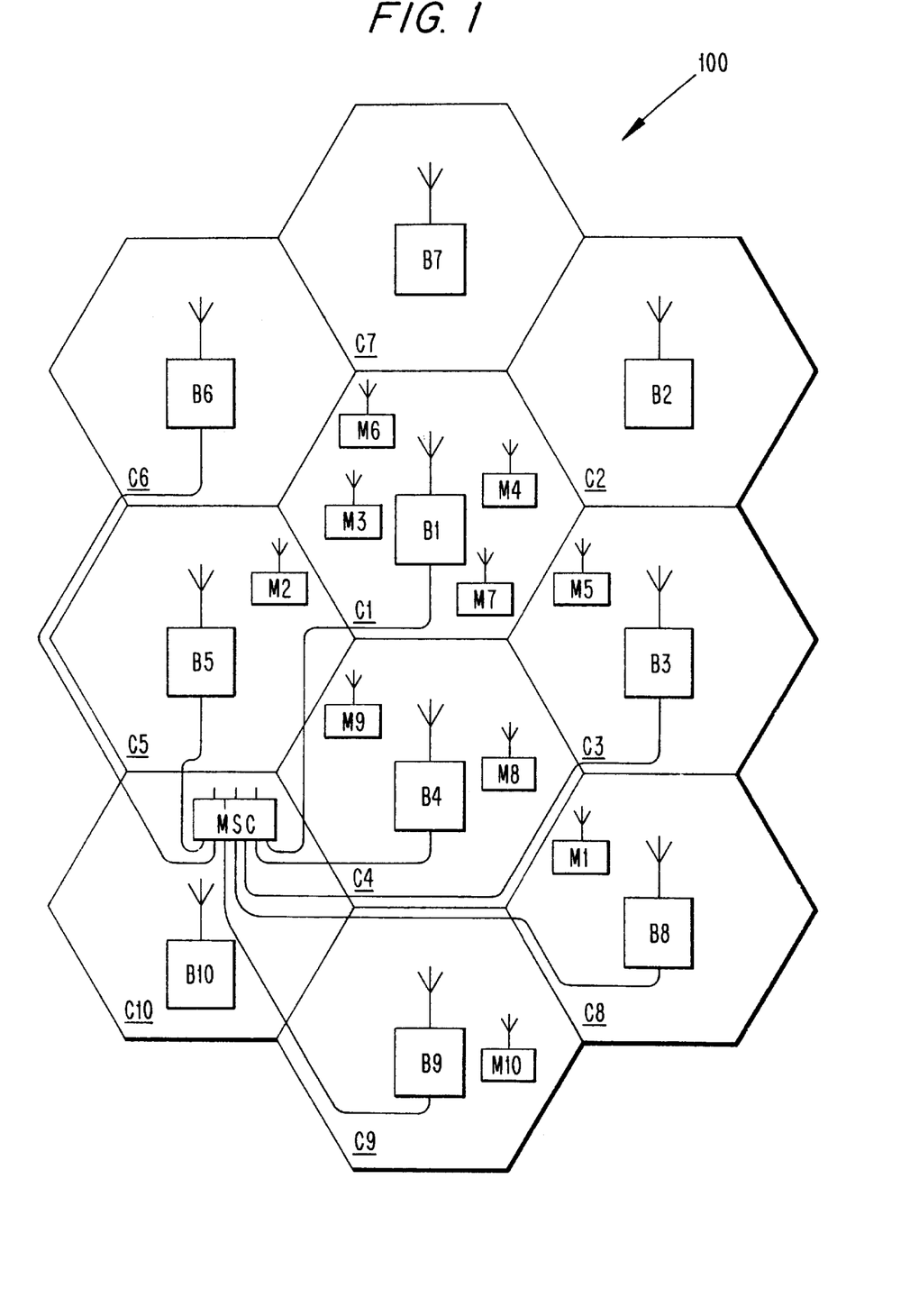
FIG. 1 is a block diagram illustrating ten cells in a cellular mobile radio telephone system to which the invention applies.

FIG. 1 is a schematic diagram illustrating the relationship between 10 cells (C1–C10) in a typical cellular telephone network 100 (herein referred to as a "cellular network") such as D-AMPS. Generally, a cellular network would have far more than ten cells; however, 10 is sufficient for illustrative purposes.

In each cell C1 to C10, there is a base station B1 to B10. Although FIG. 1 shows the base stations located toward the center of each cell, base stations may be located anywhere in the cell. Base stations located toward the center typically employ omni-directional antennas, while base stations located toward a cell boundary typically employ directional antennas.

The mobiles M1–M10 represent the mobile telephone units. Of course, the mobiles can move about in one cell or they can move about from one cell to another cell. Typically, there are far more mobiles than ten. Again, showing ten mobiles is sufficient for illustrative purposes.

The cellular network 100 depicted in FIG. 1 also has a mobile switching center (MSC). The MSC connects to each of the base stations by cable, radio links, or both (not illustrated in FIG. 1). The MSC is also connected to a fixed telephone switching unit (also not illustrated in FIG. 1).

The cellular network 100 illustrated in FIG. 1 uses a fixed number of radio frequencies (channels) for communication. In the invention, the frequency channels correspond to the frequencies in the 800 MHz band or the 1900 MHz band. Although the invention is intended for use in a system such as an Ericsson Radio CMS88 digital system for the purpose of facilitating frequency planning for digital traffic channels, the invention will work in a dual mode system where analog and digital frequencies share the spectrum in each cell. This may be important in the deployment phase before all of the manually tuned combiners have been replaced.

Figure 2:
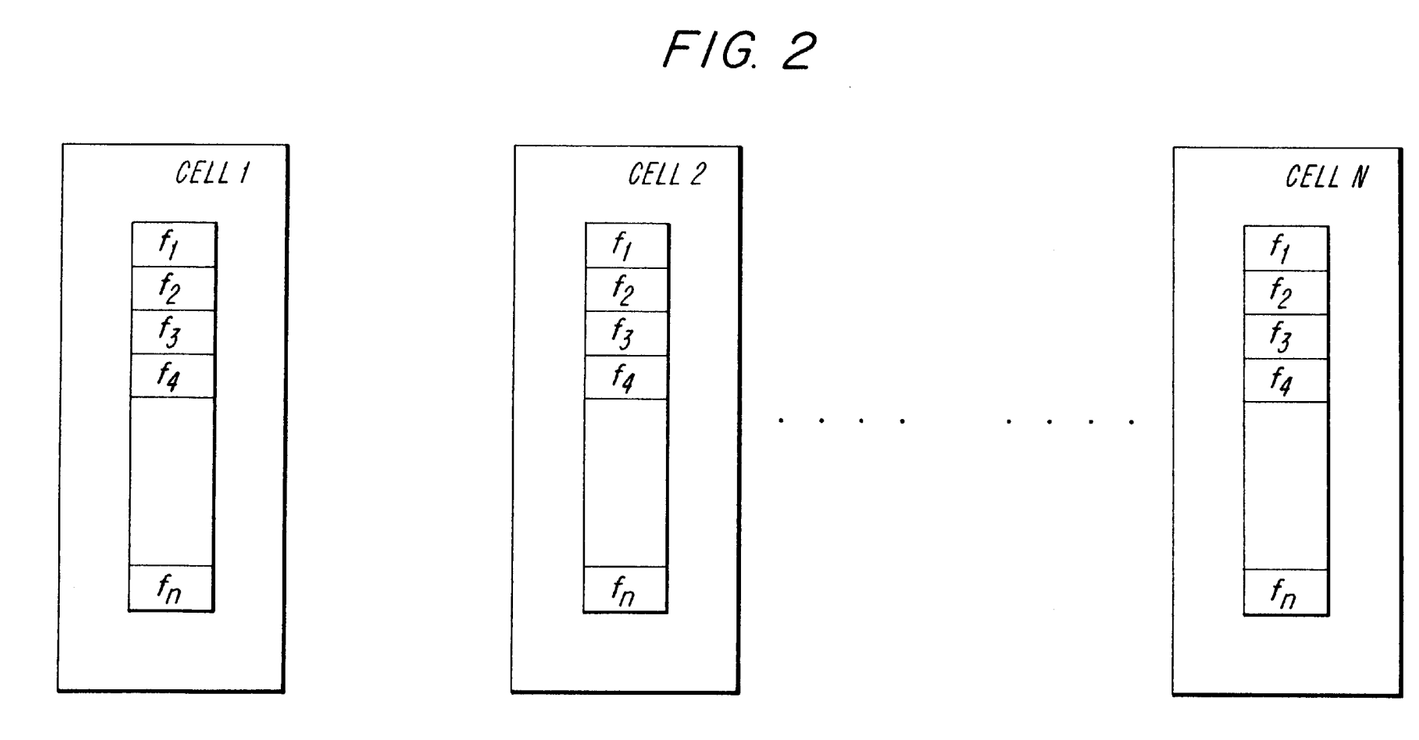
FIG. 2 is a diagram showing the organization of frequency channels in each cell of a cellular network in accordance with one aspect of the invention.

In a cellular network that employs a conventional allocation strategy, fixed or adaptive, each cell is allocated a number of frequency channels which correspond to a subset of all frequency channels available to the cellular network as a whole. FIG. 2 illustrates that with this invention, each cell in the network may select, for use in the cell, frequency channels from the same overall set of frequencies. For example, if there are n number of frequency channels in a cellular network comprising N number of cells, each cell could be defined by the entire set of frequency channels $f_1$ to $f_n$. While cell 1 through cell N may have the same set of frequency channels from which to select, each cell will select (i.e., allocate) only those frequency channels having the best average signal quality.

The invention accomplishes this by performing various signal quality measurements (explained in greater detail below) on the set of frequencies in the cell. Therefore, signal quality measurements are made not only for those frequency channels in use or available for use, but also for those frequency channels that are not currently being used or available for use, though they may become available at a later time. These various signal quality measurements are processed, filtered, and evaluated, as described in greater detail below, and used as a basis for exchanging frequency channels being used or available for use, with frequency channels not being used that exhibit better average signal quality. In accordance with one aspect of the invention, there are two types of frequency channel exchange: a basic exchange and a forced exchange, both of which are described in greater detail below.

To facilitate the automatic exchange of frequency channels within a given cell, the invention classifies each frequency channel allocated to a cell into one of the following groups. First, selected frequency channels (herein referred to as selected frequency channels), are those frequency channels which are currently being used or are available for use in a cell. In a preferred embodiment of the invention, selected frequency channels are always digital channels. In order for a frequency channel to be a selected frequency channel, the base station must have a transceiver and, where applicable, a combiner tuned to the corresponding frequency.

Second, candidate frequency channels are all other frequency channels not currently available for use in the cell. However, candidate frequency channels may become available for use if exchanged with one of the selected frequency channels. An exchange can only take place if the signal quality of the candidate frequency channel is significantly better (defined below) than the signal quality of one of the selected frequency channels. In addition, the candidate frequency channel must meet certain other signal quality criteria. Candidate frequency channels that fulfill these other signal quality criteria are referred to as qualified candidate frequency channels.

In one embodiment of the invention, a candidate frequency channel becomes a qualified candidate frequency channel if the downlink signal quality measurement for the candidate frequency channel is not significantly lower than the uplink signal quality measurement for the candidate frequency channel. In another embodiment of the invention, a candidate frequency channel becomes a qualified candidate frequency channel if, in addition to a downlink signal quality measurement that is not significantly lower than the uplink signal quality measurement as described above, there is a sufficient frequency separation (as defined below) between the candidate frequency channel and the nearest selected frequency channel. In a preferred embodiment of the invention, a candidate frequency channel becomes a qualified candidate frequency channel if, in addition to a downlink signal quality measurement that is not significantly lower than the uplink signal quality measurement and an adequate frequency separation, as described above, the candidate channel frequency, when combined with any of the selected frequencies (other than the selected frequency with which it may be exchanged), does not result in third order intermodulation products that are equal to the selected channel frequencies. Also in a preferred embodiment of the invention, signal quality is measured in terms of interference level, where a low signal quality equates to a high interference level. These criteria: 1) downlink signal quality, 2) sufficient channel separation, 3) the absence of certain third order intermodulation products, will be described in greater detail below.

In addition to selected frequency channels and candidate frequency channels, there are also permanently selected frequency channels. Permanently selected frequency channels, unlike selected frequency channels may be analog or digital channels and, in a preferred embodiment, permanently selected frequency channels can only be exchanged manually. In a preferred embodiment, frequency channels may also be classified as supplementary selected frequency channels or supplementary non-selected frequency channels. Supplementary selected frequency channels are actually a subset of permanently selected frequency channels and are used for measurement purposes. Supplementary non-selected frequency channels are not available in the cell but, in a preferred embodiment, can be made available by manual means. Supplementary non-selected frequency channels are used for measurement purposes.

The specific way in which the invention performs the various signal quality measurements and channel exchanges will now be described in greater detail. As stated above, there are two different channel exchange strategies: a basic exchange and a forced exchange. The basic channel exchange strategy will be described first.

Figure 3:
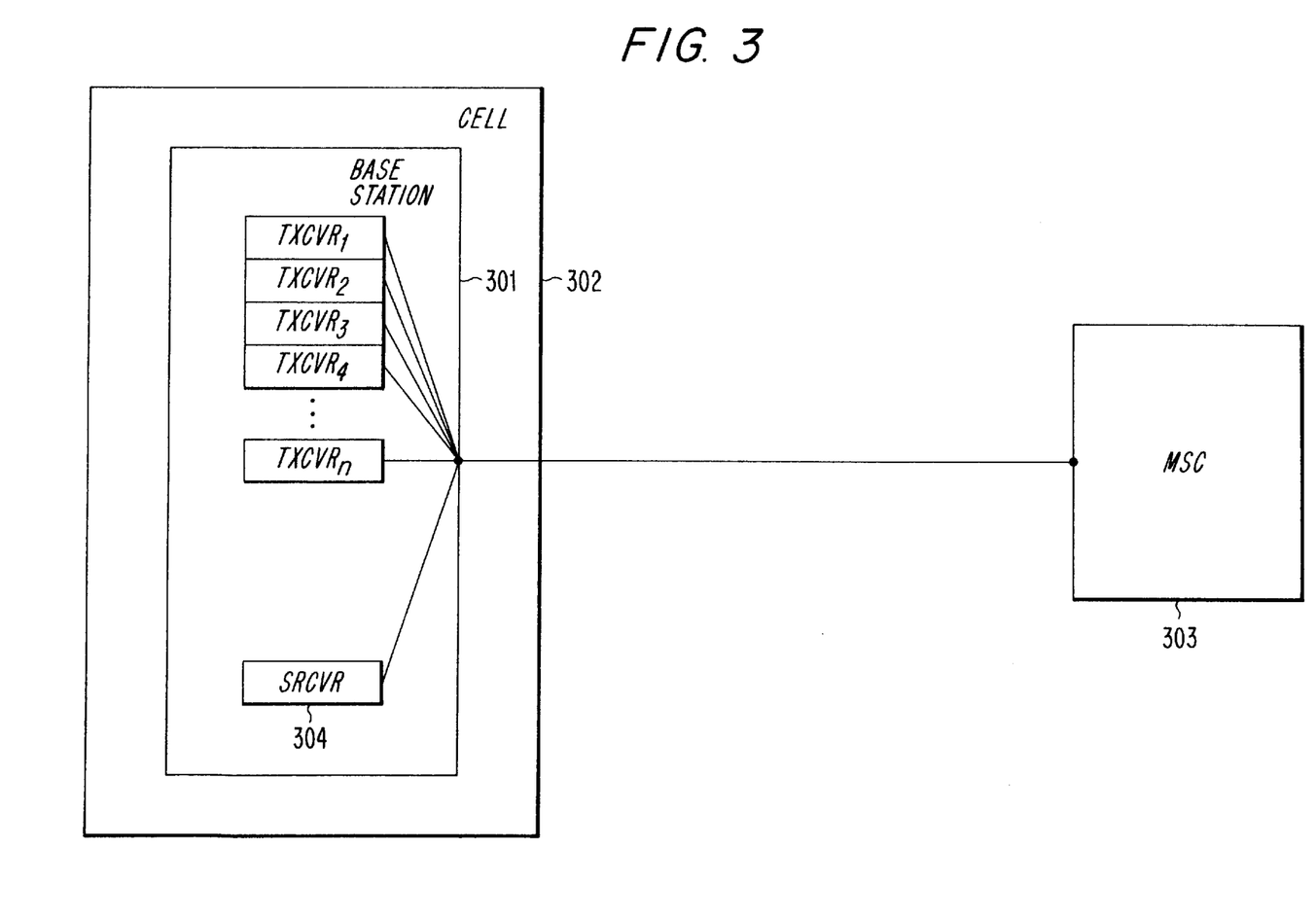
FIG. 3 is a diagram illustrating a base station within a cell including the equipment in the base station used to transmit, receive, measure and filter each frequency channel in the cell in accordance with one aspect of the invention.

With the basic exchange strategy, the uplink signal quality of each frequency channel is measured for all selected frequency channels and all candidate frequency channels. In a preferred embodiment, uplink signal quality is measured in terms of uplink interference level. For selected frequency channels, uplink interference levels are measured by the corresponding transceivers located in the base station of each cell. For example, FIG. 3 shows a base station 301, in a cell 302, where the base station contains transceivers, TXCVR 1, 2, 3, 4, . . . , m. These transceivers 1, 2, 3, 4, . . . , m are each tuned to a respective one of the frequencies corresponding to selected frequency channels 1, 2, 3, 4, . . . , m. Each of these transceivers 1, 2, 3, 4, . . . , m measures signal strength during idle time periods (herein referred to as a time slots) on the corresponding selected frequency channel. Each selected frequency channel contains three time slots. During each time slot, a transceiver can transmit and receive a separate call. Dividing the selected frequency channels in this manner is known in the art as time division multiple access (TDMA). When any one of the three time slots becomes idle (i.e., no telephone call on the time slot), the corresponding transceiver measures the signal strength for the corresponding selected frequency channel during the idle time slots. Because there is no voice signal on the empty time slot, the signal strength measurement represents the level of interference for the selected frequency channel due to co-channel interference from other cells in the network, adjacent channel interference, and noise.

Although supplementary selected frequency channels are not automatically exchanged with qualified candidate frequency channels, uplink signal strength measurements are performed. If a supplementary selected frequency channel is a digital channel, signal strength is measured during idle time slots. If a supplementary selected frequency channel is an analog channel, signal strength measurements are made continuously at predesignated, idle time intervals, since there are no time slots associated with the analog channels.

For candidate frequency channels, uplink interference levels are measured much the same way as uplink interference levels are measured for the selected frequency channels. Interference levels are measured by a scanning receiver 304 also located in the base station of the cell. This scanning receiver 304 can be tuned to a respective one of the frequencies corresponding to the candidate frequency channels or the supplementary non-selected frequency channels. Unlike selected frequency channels, there are no time slots associated with candidate frequency channels because the base station does not transmit voice traffic over these channels. Again, signal strength directly measures the level of interference in the corresponding candidate frequency channel due to co-channel interference and adjacent channel interference from other cells in the network and noise.

The scanning receiver 304 shown in FIG. 3, is similar to the transceivers, TXCVR 1, 2, 3, 4, . . . , m. The difference between them is essentially functional. Since there is no voice traffic within this cell over the candidate frequency channels, the scanning receiver need only receive and measure signal strength. However, where a separate transceiver is needed for each selected frequency channel, only one scanning receiver is needed to make measurements for all of the candidate frequency channels. The scanning receiver scans through each of the frequencies associated with the candidate frequency channels and measures the corresponding signal strength for each of them.

As previously mentioned, all of the signal strength measurements, including the uplink measurements described above, are preferably filtered continuously using adaptation filters located in the base station (not illustrated in FIG. 3). By filtering the uplink signal strength measurements, decisions regarding the exchange of frequency channels are not based on instantaneous signal strength measurements. The base station then transmits the filtered signal strength measurements to the MSC 303, which performs a comparison between the selected frequency channel filtered, uplink signal strength measurement (i.e., interference level) with the candidate frequency channel filtered, uplink signal strength measurement (i.e., interference level). The MSC 303, based on this comparison, decides whether an exchange is warranted.

The method for comparing the selected frequency channel uplink interference levels with the qualified candidate frequency channel uplink levels and performing a frequency selection and exchange will now be described in greater detail. As stated above, the primary purpose of the invention is to automatically replace frequency channels which have the highest interference levels. If there is a qualified candidate frequency channel with a better interference level (i.e., lower interference), the system will initiate an exchange.

Figure 4:
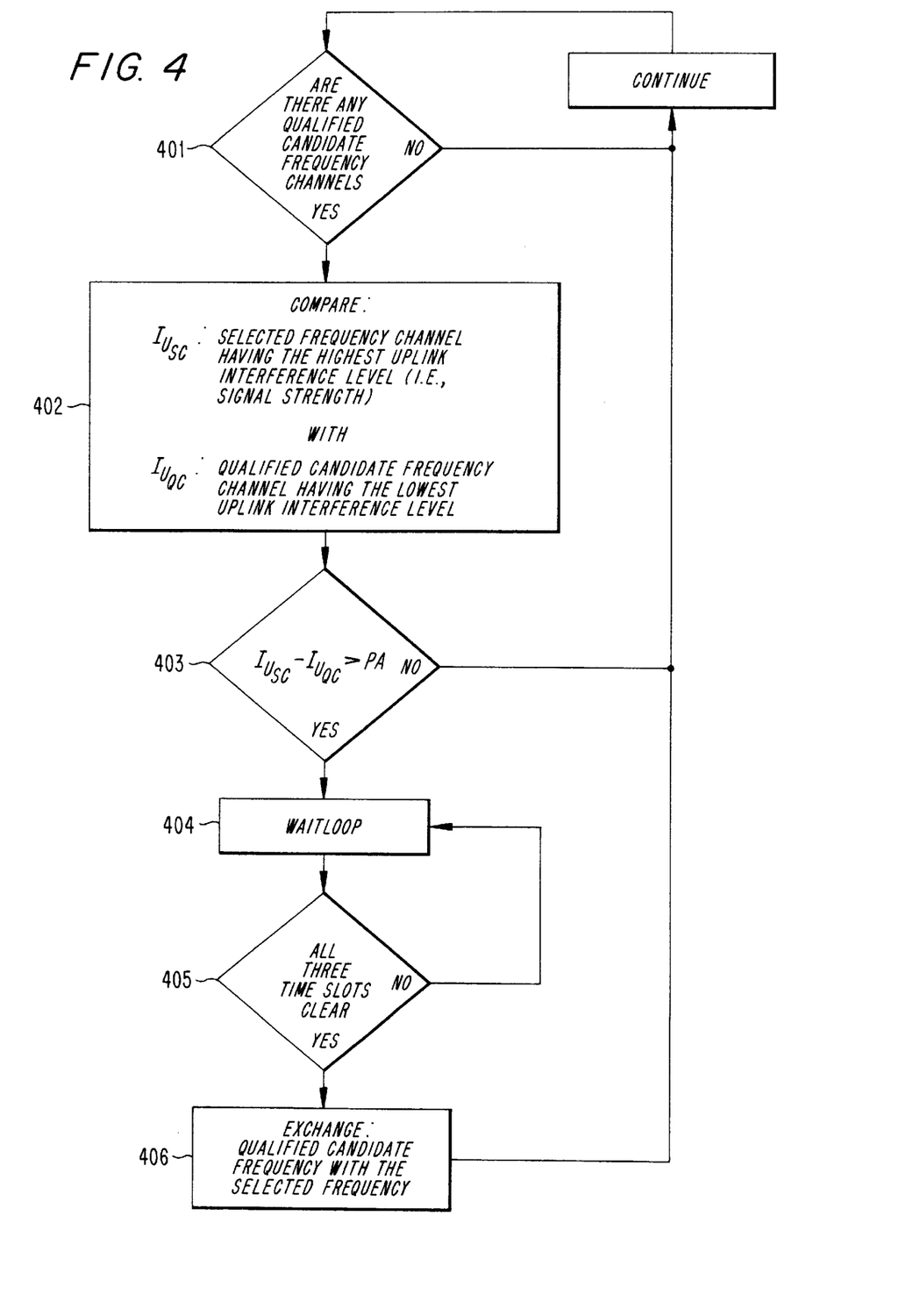
FIG. 4 is a flowchart depicting the process of comparing and exchanging selected frequency channels and qualified candidate frequency channels.

FIG. 4 illustrates the method employed to compare and exchange a qualified candidate frequency channel with a selected frequency channel. First, the MSC 303 determines whether any of the candidate frequency channels are qualified. The method for qualifying a candidate frequency channel was previously mentioned but will be described in greater detail below. If none of the candidate frequency channels are qualified, no exchange can take place. This step is illustrated in FIG. 4 as step 401. If there is at least one candidate frequency channel, the MSC 303 compares the filtered, uplink interference level of the selected frequency channel having the highest uplink interference level with the qualified candidate frequency channel having the lowest uplink interference level. This step is illustrated as step 402. If the filtered, uplink interference level of the selected frequency channel, $I_{Usc}$, exceeds the filtered, uplink interference level of the qualified candidate frequency channel, $I_{Uqc}$, by at least a predetermined amount, PA, the MSC 303 initiates an exchange of the qualified candidate frequency channel in place of the selected frequency channel. This step is illustrated as the "yes" path out of decision block 403. Even if automatic channel allocation is deactivated, and the MSC 303 is not initiating exchanges between qualified candidate frequency channels and selected frequency channels, the invention will continue to send uplink interference level measurements to the filters which, in turn, continue to update and store the filtered output interference levels.

In accordance with one aspect of the invention, the MSC 303 does not execute the exchange instantaneously. The actual exchange may be delayed for a period of time equal to the time it takes to transmit filtered interference data to the MSC 303 from the base station 301 plus the time it takes the MSC 303 to evaluate the filtered interference data. This delay period is not illustrated in FIG. 4. In addition, the MSC 303 may further delay the execution of the exchange because voice signals may be present on any of the three selected frequency channel time slots. Because it would not be preferable to make the exchange while there is voice traffic on the selected frequency channel, the method initiates a waitloop to allow all three time slots to clear. This step is illustrated in FIG. 4 as steps 404 and 405. During this waitloop, the MSC 303 precludes assigning new calls to the selected frequency channel. Once all of the time slots are clear, the MSC 303 will execute the exchange (step 406).

As set forth above, with respect to step 403, the difference between the filtered uplink interference level of the qualified candidate frequency channel and the filtered uplink interference level of the selected frequency channel must be greater than or equal to a predetermined amount. This predetermined amount, also referred to as the "hysteresis", is a system parameter and the value is manually set.

The purpose for employing the hysteresis is to insure that the MSC 303 does not attempt to initiate an exchange when the uplink signal quality of the candidate frequency channel marginally exceeds the uplink signal quality of the selected frequency channel. If the method did not employ the hysteresis, extremely small, cyclical fluctuations in the filtered, uplink interference level of one or both frequency channels may be enough to initiate a back-and-forth exchange between the two frequency channels, where both channels have filtered, uplink interference levels that are virtually equal.

In addition to the exchange of frequency channels described above, another aspect of the invention provides a second type of exchange, referred to as a forced exchange. This second type of channel exchange takes into account the signal quality of the downlink as well as the signal quality of the uplink by comparing the two for each selected frequency channel. In a preferred embodiment, the signal quality of the downlink and the signal quality of the uplink are measured in terms of Bit Error Rate (BER). The purpose of the forced exchange is to insure that selected frequency channels that otherwise have good uplink signal quality do not remain in use if the downlink signal quality has substantially deteriorated.

Figure 6:
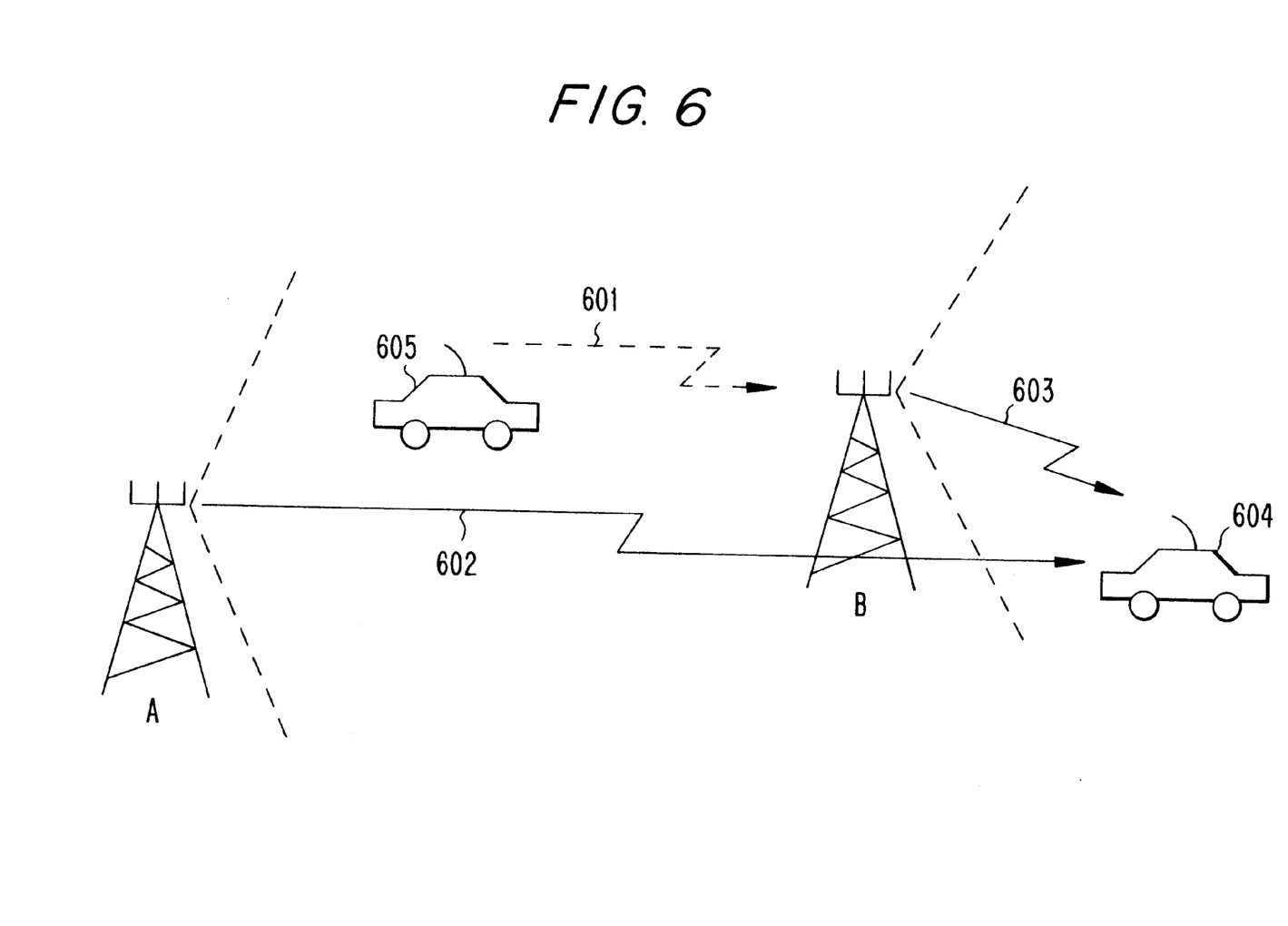
FIG. 6 is a diagram showing how the downlink for a frequency channel can be adversely affected by co-channel interference even though the base station in the cell is unaware of the problem.

For example, suppose that in a cellular system, there is a mixture of cells with a Fixed Channel Allocation and cells where frequency selection is done automatically in accordance with the invention. This may frequently occur in practice, especially where a cellular system is transitioning from a fixed channel allocation system to the inventive automatic channel allocation system. In this situation, there may be a period of time where some base stations are still operating on a fixed group of frequency channels while others are operating in accordance with the invention. Consider FIG. 6. Assume that base stations, A and B, corresponding to cell A and B (not illustrated in the figure), have directional antennas as indicated in the figure. Furthermore, cell A is a fixed channel allocation cell whereas cell B is an automatic channel allocation cell. Suppose, the two cells share a common frequency channel where the transmissions over the channel are illustrated as 601, 602 and 603. Although a mobile 604 in cell B may be greatly affected by the base station in cell A, as shown by downlink transmission 602, the base station B may never become aware of the problem because the directional antenna in base station B prevents base station B from interference emanating from mobile 605 and base station A in cell A. Base Station A, on the other hand, will receive co-channel interference over the selected frequency, but will be unable to exchange frequencies because it is a fixed channel allocation cell.

In most cases, a candidate frequency channel will never become qualified if its downlink interference level is substantially affected by co-channel interference and adjacent channel interference. Therefore, the candidate frequency channel will not be exchanged with a selected frequency channel, thus helping to insure that selected frequency channels have good downlink signal quality. However, in the event that such an exchange does take place, or in the situation where downlink signal quality substantially deteriorates after an exchange takes place, this second type of exchange or forced exchange, based on uplink and downlink BER measurements, will correct the problem.

Figure 7:
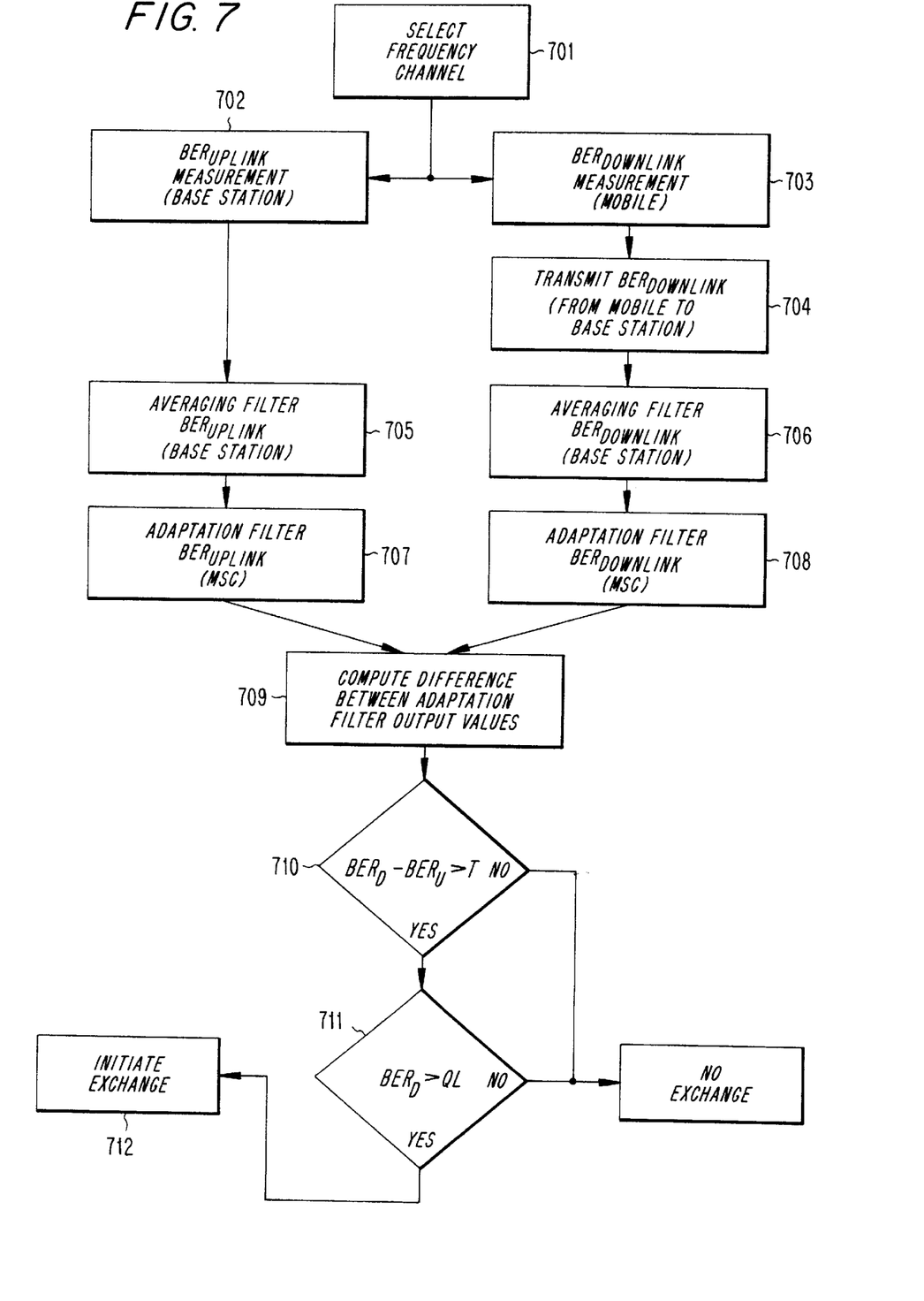
FIG. 7 is a flowchart depicting the process of measuring and comparing BER and forced exchange.

Referring now to FIG. 7, the forced exchange strategy will now be explained in greater detail. Once a frequency channel is selected for use in a cell (i.e., designated as a selected frequency channel) as illustrated in block 701, the invention begins measuring BER for the uplink and downlink. For the uplink, the base station measures the BER for each call (i.e., each time slot being used for voice traffic) on the selected frequency channel as illustrated in block 702. For downlink, the mobile measures BER, then transmits the measurement back to the base station as illustrated in blocks 703 and 704. The base station computes average uplink BER values and average downlink BER values for each call segment using averaging filters 705 and 706.

At the end of each call segment, the base station transmits updated, average BER values for both the uplink and downlink of each selected frequency channel to the MSC 303. MSC 303 filters the average uplink BER value and the average downlink BER value for the call segment using an adaptation filters 707 and 708 (described in greater detail below). The MSC then computes a difference value, as illustrated by block 709. The MSC 303 then compares the difference value to a predefined threshold value, as shown in block 710. The MSC 303 also compares the filtered downlink BER value (i.e., output of block 708) to a predefined quality level, as shown in block 711. If the average, filtered downlink BER value is greater than the average, filtered uplink BER value by at least the predefined threshold value and the average, filtered downlink value is greater than the predefined quality level, the MSC 303 will initiate a forced exchange between the selected frequency channel and the best qualified candidate frequency channel, as illustrated in block 712, assuming at least one candidate frequency channel is qualified. The best qualified candidate frequency channel is the qualified candidate frequency channel exhibiting the highest uplink signal quality (i.e., the lowest interference level).

The forced exchange is intended to supplement the basic exchange. Although both types of exchange occur independent of one another, the forced exchange helps to insure that selected frequency channels which otherwise exhibit good uplink signal quality are replaced if their downlink signal quality has deteriorated after being put into use in the cell (i.e., allocated). The purpose of the invention is not only to provide automatic channel allocation, but also to insure that the selected frequency channels are those which exhibit the best average signal quality. To accomplish this, the invention, as mentioned above, filters each interference level measurement and each BER measurement over extended periods of time. By employing these filters, the invention can provide automatic channel allocation that is less affected by temporary fluctuations in the system (i.e., fluctuations in the signal strength and BER).

In a preferred embodiment of the invention, there are many filters being used. For each selected frequency channel, the base station maintains an adaptation filter, for uplink signal strength measurements (i.e., interference level), and an averaging filter for both the uplink BER and downlink BER measurements. The MSC maintains an adaptation filter for both the average uplink BER and the average downlink BER measurements. For each candidate frequency channel and for each supplemental non-selected frequency channel, the base station maintains an adaptation filter for uplink signal strength measurements (i.e., interference level) and an averaging filter for downlink signal strength measurements. The MSC maintains an adaptation filter for the average downlink signal strength measurements. For each supplemental selected frequency channel, the base station maintains an adaptation filter for uplink signal strength measurements.

Figure 5:
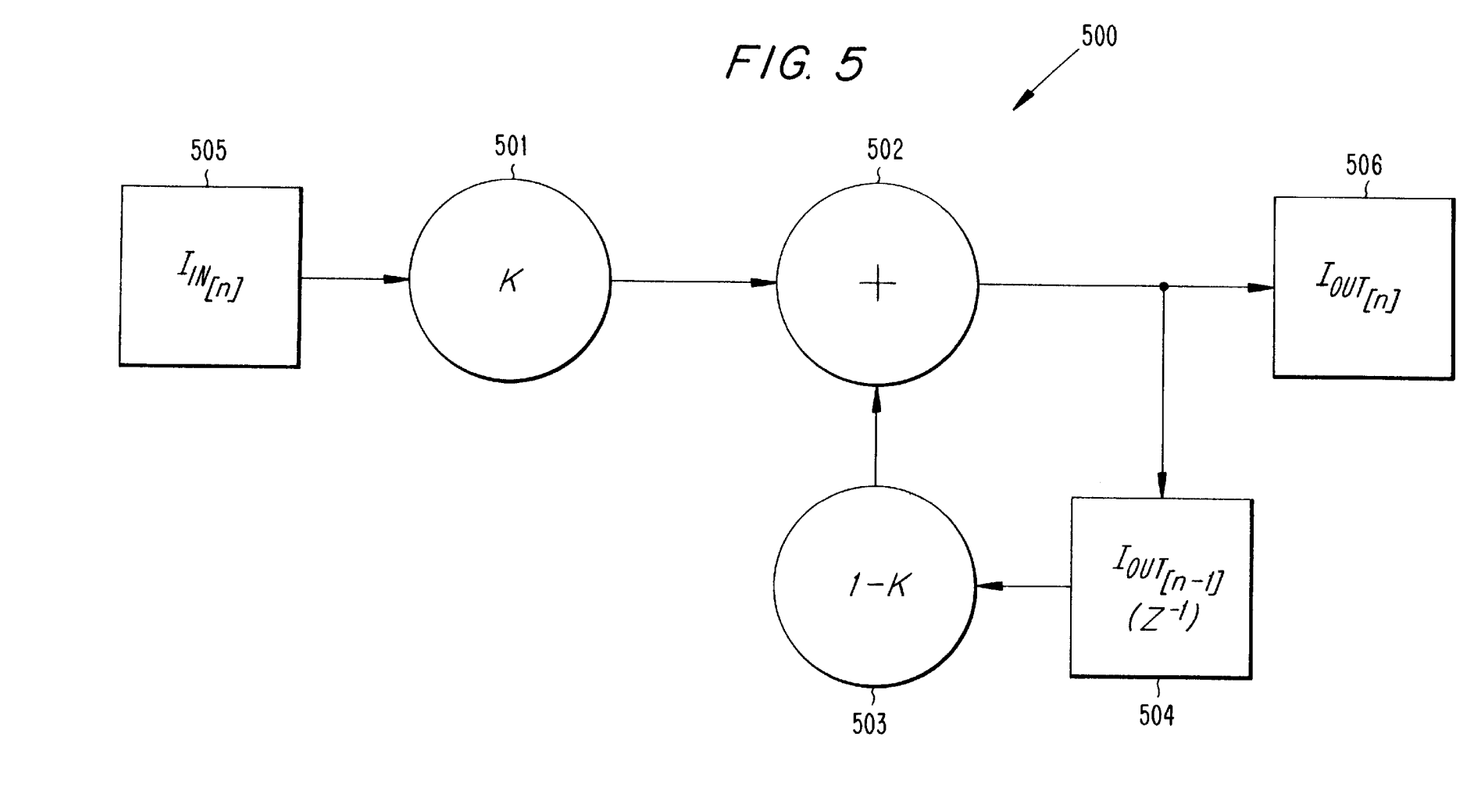
FIG. 5 is a diagram illustrating the adaptation filter.

Whenever a measurement is performed, whether the it involves BER or interference level, the input values and output values associated with the corresponding adaptation filters are updated as illustrated in FIG. 5. For example, if the uplink interference value at this moment in time is $I_{in[n]}$505, the filtered uplink interference value, $I_{out[n]}$506, is derived as follows:

$$I_{out[n]} = (1-k)\, I_{out[n]} + k\, I_{in[n]}$$

where $I_{out[n-1]}$504 is the filtered uplink interference value after the adaptation filter was last updated. The filtered uplink interference value $I_{out[n]}$506 is stored in the transceiver or scanning receiver (depending on whether the uplink being measured corresponds to a selected frequency channel or a candidate frequency channel), and becomes the value for $I_{out[n-1]}$504 during the next filter update.

The parameter k 501 is a weighting factor that represents the importance of the new or updated measurement $I_{in[n]}$505. It is preferably calculated from a filter time constant, T (not illustrated in FIG. 5), and the update period, dt (i.e., the time that has elapsed since the previous update) as follows:

$$k = \min\,(0.2,\, dt/T).$$

As dt increases, the adaptation filter places greater emphasis (i.e., importance) on the new or updated measurement $I_{in[n]}$505. However, in no case will k exceed the value 0.2.

The filter time constant, T, is a parameter that is manually set and determined empirically (e.g., by means of simulators), so as to yield the best filter response. The actual value of T will vary from cell to cell and may vary depending upon how the frequency channel is currently defined (i.e., as a selected frequency channel, candidate frequency channel, supplemental frequency channel and the like). Generally, T is a very large number compared to dt so the filter output $I_{out[n]}$506 is not influenced by brief or instantaneous fluctuations in signal quality.

In addition, there may be time periods where it is beneficial to preserve the filtered output measurement. This can be accomplished by setting the value of T to infinity. At the end of the time period, the value of T can be reset to its former value and the filter will resume where it left off, without having to re-establish a long-running average measurement.

As explained above, the invention will not exchange a candidate frequency channel with a selected frequency channel unless the candidate frequency channel is a qualified candidate frequency channel. In accordance with a preferred embodiment of the invention, a candidate frequency channel becomes a qualified candidate frequency channel if all three of the following criteria are met: 1) the filtered, downlink interference level of the candidate frequency channel is not significantly higher than the filtered, uplink interference level; 2) there is sufficient frequency separation between the candidate channel frequency and the nearest selected channel frequency, excluding the selected channel frequency which is to be exchanged with the candidate frequency channel; and 3) the frequency of the candidate frequency channel, when combined with any of the selected channel frequencies other than the selected channel frequency with which it is to be exchanged, will not result in third order intermodulation products that are equal to the selected channel frequencies, again, other than the one with which the candidate frequency channel is to be exchanged. These three criteria will now be described in greater detail.

First, the invention takes filtered, downlink interference level into consideration to avoid exchanging a selected frequency channel with a candidate frequency channel having a downlink with significantly more interference than that of the uplink. As previously mentioned, uplink signal strength (i.e., interference level) for each candidate frequency channel (and supplemental non-selected frequency channel) is measured in the base station by a corresponding scanning receiver (refer to FIG. 3). Downlink signal strength for one or more candidate frequency channels is measured by the mobile assisted handover (MAHO) unit in each mobile. The mobile then transmits these measurements back to the base station.

More specifically, the base station, at the beginning of each call segment, assigns, for the purpose of measurement, one or more candidate frequency channels (and supplemental non-selected frequency channels) to the mobile unit associated with the call segment. A call segment is defined as the period of time during which a call is active on a given frequency channel. Since the mobile is only receiving and transmitting voice traffic over one of the three time slots associated with the call segment, the mobile can measure during the remaining two time slots, the downlink signal strength for many candidate frequency channels (or supplemental non-selected frequency channels). In a preferred embodiment of the invention, the mobile is capable of measuring up to twelve candidate or supplemental non-selected frequency channels during the two remaining time slots. The mobile then transmits the downlink signal strength measurements back to the base station.

The base station assigns the frequency channels at the beginning of each call segment in a cyclic manner within each group (i.e., qualified candidate frequency channels, candidate frequency channels, supplemental non-selected frequency channels and so on). If there are any qualified candidate frequency channels already designated, 25% of the measurement resources (i.e., every fourth call segment in the cell) should preferably be used to measure the ten best qualified candidate frequency channels, or all of the qualified candidate frequency channels, whichever is smallest. The remaining 75% of the measurement resources (i.e., three of every four call segments in the cell) are preferably used to measure the remaining candidate frequency channels and the supplemental non-selected frequency channels. If the number of remaining candidate and supplemental non-selected frequency channels is less than forty, the measurements should preferably be evenly distributed for all of the candidate and supplemental non-selected frequency channels. One way to accomplish this is to cycle through a list of channels within each of the two groups defined above, that is the 25% group and the 75% group.

The downlink signal strength for each measured frequency reported by the mobile is filtered in the base station 301 using averaging filters. At the end of each call segment, the average downlink signal strength measurements are transmitted by the base station 301 to adaptation filters located in the MSC 303. The uplink signal strength measurements are filtered in the base station using adaptation filters. The base station then transmits the signal strength measurements to MSC 303 periodically. The MSC 303 also maintains adaptation filters for the downlink signal strength measurements for each candidate frequency channel and each supplemental non-selected frequency channel in the cell. The MSC 303 then determines whether the downlink signal strength, $I_{down}$, for each candidate frequency channel is significantly higher than the filtered uplink signal strength, $I_{up}$, for the candidate frequency channel. If so, the candidate frequency channel is not qualified. More specifically, the candidate frequency channel is not qualified if:

$$I_{up} < (I_{down} + I_{diff} - I_{marg})$$

where $I_{diff}$ is an adjustment (in dB) that adjusts for systematic differences between the uplink and the downlink. Typically, $I_{diff}$ is determined by averaging the filtered uplink interference level for all candidate frequency channels in the cell and subtracting an average filtered downlink interference level for all candidate frequency channels in the cell. $I_{marg}$ is a margin (in dB) defining how much higher downlink interference level must be than uplink interference level (i.e., signal strength) before the candidate is assumed qualified. The value of $I_{marg}$ is a parameter that is empirically determined and manually set.

The second criterion for qualifying a candidate frequency channel is that the candidate frequency channel cannot cause third order intermodulation products when combined with any of the selected frequency channels being used in the cell. Third order intermodulation products are defined by the following formula:

$$f_{im} = 2 * f_1 - f_2$$

where the candidate channel frequency and the selected channel frequency are applied to the variables $f_1$ and $f_2$ in both combinations. If $f_{im}$ corresponds to a base station transceiver frequency in the cell, the candidate frequency channel is not qualified.

When a new selected frequency channel is being added to the base station, the candidate frequency channel to be chosen must first be paired with all of the selected channel frequencies in use in the cell. When an existing selected frequency channel is being exchanged with the best candidate frequency channel, the candidate channel frequency must be paired with all of the selected channel frequencies in use in the cell except the selected channel frequency to be exchanged.

The third criterion for qualifying a candidate frequency channel establishes how close two transmitter frequencies can be to each other. If a candidate frequency channel does not meet the channel separation requirements when paired with the selected frequency channels in the cell, not including the selected frequency channel to be exchanged, the candidate frequency channel should preferably not be qualified. Channel separation is preferably measured in intervals of 30 KHz from the center frequency of one channel to the center frequency of the other channel. The actual channel separation value is manually set, and it is usually a function of antenna combiner capability.

In addition to automatic channel allocation through the basic and forced channel exchange strategies described above, the invention provides automatic channel selection at voice channel seizure. In other words, during the seizure of a new traffic channel at call setup, the invention automatically selects any idle time slot on the selected frequency channel that exhibits the lowest (best), filtered uplink interference measurement. Moreover, in another aspect of the invention, the best selected frequency channel continues to be seized at voice channel seizure whether or not automatic channel allocation is enabled or disabled. Automatic channel selection at voice channel seizure, in conjunction with automatic channel allocation, provides the best radio link quality possible.

As stated above, one purpose of the invention is to provide automatic channel allocation to more efficiently allocate channels in a cell in response to a constantly changing RF environment. To meet this objective, the invention is not only capable of exchanging channels through the basic and forced exchange strategies described above, but also through adding and deleting frequency channels from the channel set in a cell.

In order to meet greater demands within a cell, the invention can increase the number of selected frequency channels used in a cell. This is referred to as deblocking, and involves the addition or activation of a new transceiver in the base station.

In adding one or more selected frequency channels, the invention uses the best qualified candidate frequency channels (i.e., the qualified candidate frequency channels having the lowest filtered uplink interference level). In addition, channel separation requirements should preferably be met with respect to all selected frequency channels. In another aspect of the invention, if there is no qualified candidate frequency channel due to the failure to meet channel separation requirements or due to the presence of certain intermodulation products, the minimum channel separation requirement is temporarily decremented by one interval at a time (i.e., one 30 KHz interval as described above) until at least one candidate frequency channel passes (i.e., becomes qualified). If more than one candidate frequency channel passes, then the one with the lowest filtered uplink interference level is chosen. Once a candidate frequency channel is selected, the normal minimum channel separation requirement is re-established. Although the channel selection requirement is violated for a short period of time, channel separation requirements are eventually met after a few channel exchanges.

Figure 8A:
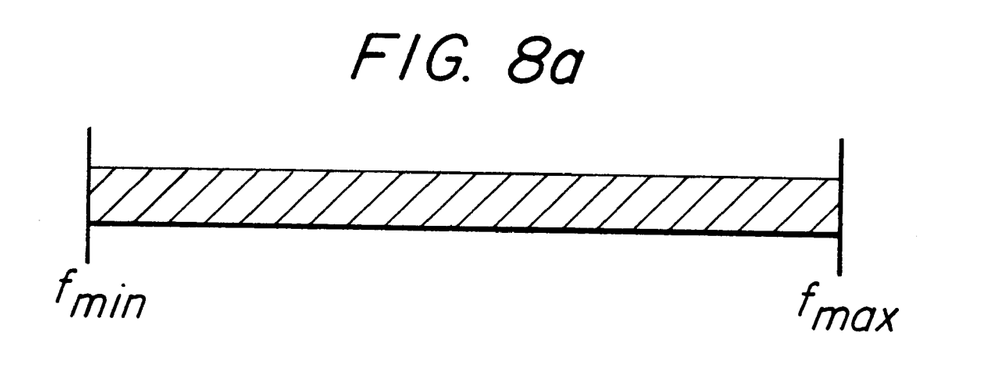
FIGS. 8a and 8b are diagrams illustrating both a continuous band of frequencies and two, non-continuous frequency bands.

In accordance with yet another aspect of the invention, the addition of new selected frequency channels may be precluded under certain circumstances. First, assuming one continuous band of frequencies as illustrated in FIG. 8a, the addition of a new selected frequency channel will be precluded if the number of transceivers, including the one to be added, is greater than a limit, $N_{lim}$, where $N_{lim}$ is defined by the following equation:

$$N_{lim} = N_{freq}/(F_{sep}+2).$$

Figure 8B:
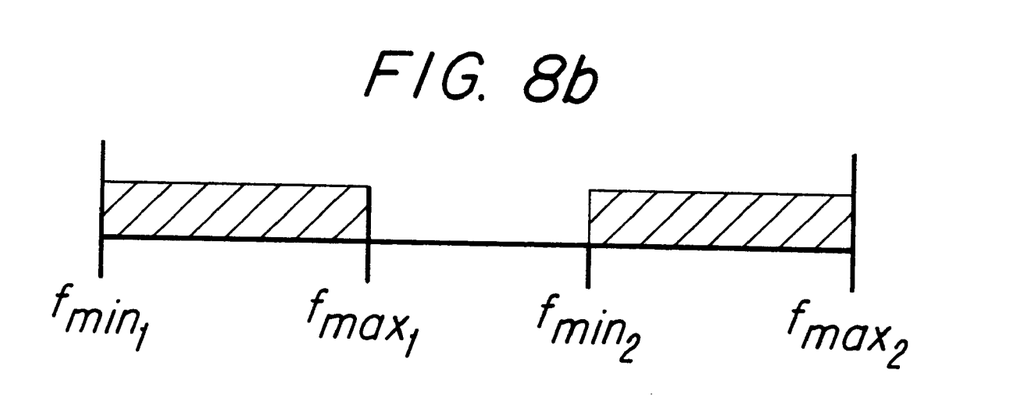

$N_{freq}$ is the number of frequencies in the frequency band being used and $F_{sep}$ is the channel separation requirement. If band of frequencies is not continuous as illustrated in FIG. 8b, the number of transceivers is not compared to the limit, $N_{im}$.

Second, the addition of a new selected frequency channel may be precluded if, in temporarily reducing channel separation to qualify a candidate frequency channel (as described above), channel separation is decreased to ½ the normal minimum separation requirement without identifying a qualified candidate frequency channel. Even if deblocking is permitted, a transceiver is never taken into service until transceiver tuning time has elapsed.

In yet another aspect of the invention, selected frequency channels may be removed from a cell (i.e., deselected), it is also capable of removing them. The frequency associated with a selected frequency channel that is being removed will become a supplemental channel or a candidate frequency channel. Moreover, if the frequency is not associated with the selected frequency channel having the highest filtered uplink interference level, the frequency will become the best qualified candidate. Then the invention will automatically exchange the frequency with the selected frequency channel having the highest filtered uplink interference level during the next evaluation occurrence.

Another feature of the invention is the provision of a switch for enabling and disabling automatic channel allocation. When disabled, the cellular network must allocate channels manually. However, even if automatic channel allocation is disabled, the invention preferably continues to measure, filter, and store uplink and downlink interference levels (i.e., signal strength) and uplink and downlink BER values as defined above. Therefore, when automatic channel allocation is once again enabled or restarted, the filtered interference and filtered BER data are not lost. Furthermore, the invention provides the capability to enable or disable automatic channel allocation for individual cells, for a list of cells and for all cells in a cellular network.

The invention has been described with reference to a particular embodiment. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for allocating a frequency channel to a base station in a telecommunications network, thereby making the frequency channel available for subsequent use by the base station regardless of whether the frequency channel is required for immediate assignment to a mobile call, said method comprising the steps of:

measuring uplink signal quality for each of a plurality of selected frequency channels, wherein the plurality of selected frequency channels is defined as a set of frequency channels that are allocated to the base station;

measuring downlink signal quality for each of said plurality of selected frequency channels;

comparing the measured uplink signal quality with the measured downlink signal quality for each of said plurality of selected frequency channels;

identifying a selected frequency channel from the plurality of selected frequency channels if the measured downlink signal quality for the selected frequency channel is less than a first predefined amount and the measured downlink signal quality for the selected frequency channel is less than the measured uplink signal quality by at least a second predefined amount;

identifying a candidate frequency channel, wherein a candidate frequency channel is defined as a frequency channel that is not presently allocated to the base station;

allocating the candidate frequency channel to the base station; and deallocating the identified selected frequency channel from the base station.

2. The method of claim 1, wherein the steps of measuring uplink signal quality for each of the plurality of selected frequency channels and measuring downlink signal quality for each of the plurality of selected frequency channels each comprise the steps of:

measuring the uplink bit error rate and measuring the downlink bit error rate for each of the selected frequency channels.

3. The method of claim 1, wherein the step of identifying a candidate frequency channel comprises the steps of:

measuring uplink signal strength for each of a plurality of candidate frequency channels;

using the uplink signal measurement for each of the plurality of candidate frequency channels to identify a set of qualified candidate frequency channels; and identifying a qualified candidate frequency channel from the set of qualified candidate frequency channels.

4. The method of claim 3, wherein the step of identifying a qualified candidate frequency channel from the set of qualified candidate frequency channels comprises the steps of:

comparing the uplink signal strength measurement for each qualified candidate frequency channel in the set of qualified candidate frequency channels; and selecting the qualified candidate frequency channel with a lowest signal strength.

5. The method of claim 1, further comprising the steps of:

measuring uplink signal strength for each of the plurality of selected frequency channels;

measuring uplink signal strength for each of a plurality of candidate frequency channels;

using the uplink signal strength measurements for each of the plurality of selected frequency channels to choose a selected frequency channel;

using the uplink signal strength measurements for each of the plurality of candidate frequency channels to choose a qualified candidate frequency channel;

comparing the uplink signal strength measurement of the chosen selected frequency channel with the uplink signal strength measurement of the chosen qualified candidate frequency channel; and allocating the chosen qualified candidate frequency channel to the base station by exchanging the chosen selected frequency channel with the chosen qualified candidate frequency channel if the uplink signal strength measurement of the chosen selected frequency channel is greater than the uplink signal strength measurement of the chosen qualified candidate frequency channel by at least a third predefined amount.

6. The method of claim 5, wherein the steps of measuring the uplink signal strength for each of the plurality of selected frequency channels and measuring the uplink signal strength for each of the plurality of candidate frequency channels each comprise the step of measuring interference signal levels.

7. The method of claim 5, wherein the step of using the uplink signal strength measurements for each of the plurality of candidate frequency channels to choose a qualified candidate frequency channel comprises the steps of:

using the uplink signal strength measurement for each of the plurality of candidate frequency channels to identify a set of qualified candidate frequency channels; and choosing one of the qualified candidate frequency channels from the set of qualified candidate frequency channels.

8. The method of claim 7, wherein the step of choosing a qualified candidate frequency channel from the set of qualified candidate frequency channels comprises the steps of:

comparing the uplink signal strength measurement for each qualified candidate frequency channel in the set of qualified candidate frequency channels with the uplink signal strength measurement of another qualified candidate frequency channel in the set of qualified candidate frequency channels; and choosing the qualified candidate frequency channel with a lowest signal strength measurement.

9. The method of claim 5, wherein the step of using the uplink signal quality measurement for each of the plurality of selected frequency channels to choose a selected frequency channel comprises the steps of:

comparing the uplink signal strength measurements for each of the plurality of selected frequency channels; and choosing the selected frequency channel with a highest signal strength measurement.

10. The method of claim 3, wherein the step of using the uplink signal strength measurement for each of the plurality of candidate frequency channels to identify a set of qualified candidate frequency channels comprises the steps of:

measuring downlink signal strength for each of the plurality of candidate frequency channels; and using the uplink signal strength measurement for each of the plurality of candidate frequency channels and the downlink signal strength measurement for each of the plurality of candidate frequency channels to identify a set of qualified candidate frequency channels; and comparing the uplink signal strength measurement with the downlink signal strength measurement for each of the plurality of candidate frequency channels and designating a candidate frequency channel as a qualified candidate frequency channel only if the downlink signal strength measurement of the candidate frequency channel is not greater than the uplink signal strength measurement by more than a third predetermined amount.

11. The method of claim 10, wherein a candidate frequency channel becomes identified as a qualified candidate frequency channel only if a channel separation between the candidate frequency channel and a nearest selected frequency channel is greater than a predefined minimum channel separation requirement.

12. The method of claim 11, wherein a candidate frequency channel becomes identified as a qualified candidate frequency channel only if the candidate frequency channel, in combination with any of the plurality of selected frequency channels except the identified selected frequency channel, does not produce third order intermodulation products equivalent to the plurality of selected frequency channels other than the identified selected frequency channel.

13. A method for allocating a frequency channel to a base station in a telecommunications network, thereby making the frequency channel available for subsequent use by the base station regardless of the frequency channel is required for immediate assignment to a mobile call, said method comprising the steps of:

measuring uplink signal strength for each of a plurality of candidate frequency channels, wherein the plurality of candidate frequency channels is defined as a set of frequency channels that are not allocated to the base station;

measuring downlink signal strength for each of said plurality of candidate frequency channels;

choosing a qualified candidate frequency channel from the plurality of candidate frequency channels; and allocating the chosen qualified candidate frequency channel to the base station, wherein the step of choosing a qualified candidate frequency channel comprises the step of:

comparing the uplink signal strength measurement with the downlink signal strength measurement for each of the plurality of candidate frequency channels and designating a candidate frequency channel as a qualified candidate frequency channel only if the downlink signal strength measurement of the candidate frequency channel is not greater than the uplink signal strength measurement by more than a predetermined amount.

14. The method of claim 13, wherein a candidate frequency channel is identified as a qualified candidate frequency channel only if a channel separation between the candidate frequency channel and a nearest selected frequency channel is greater than a predefined minimum channel separation requirement.

15. The method of claim 14, wherein said predefined minimum channel separation requirement is defined by a number of 30 KHz intervals separating a center frequency for each of two adjacent frequency channels.

16. The method of claim 14, wherein the step of allocating the chosen qualified candidate frequency channel to a base station in the telecommunications network comprises exchanging the chosen qualified candidate frequency channel with a selected frequency channel, and wherein a candidate frequency channel is identified as a qualified candidate frequency channel only if the candidate frequency channel in combination with any of a plurality of selected frequency channels, except the selected frequency channel with which the qualified candidate frequency channel is to be exchanged, does not produce third order intermodulation products equivalent to any of the plurality of selected frequency channels other than the selected frequency channel with which the qualified candidate frequency channel is to be exchanged.

17. An apparatus for allocating a frequency channel to a base station in a telecommunications network, thereby making the frequency channel available for subsequent use by the base station regardless of whether the frequency channel is required for immediate assignment to a mobile call, said apparatus comprising:

means for measuring uplink signal quality for each of a plurality of selected frequency channels, wherein the plurality of selected frequency channels is defined as a set of frequency channels that are allocated to the base station;

means for measuring downlink signal quality for each of said plurality of selected frequency channels;

means for comparing the measured uplink signal quality with the measured downlink signal quality for each of said plurality of selected frequency channels;

means for identifying a selected frequency channel from the plurality of selected frequency channels if the measured downlink signal quality for the selected frequency channel is less than a first predefined amount and the measured downlink signal quality for the selected frequency channel is less than the measured uplink signal quality by at least a second predefined amount;

means for identifying a candidate frequency channel, wherein a candidate frequency channel is defined as a frequency channel that is not presently allocated to the base station;

means for allocating the candidate frequency channel to the base station; and means for deallocating the identified selected frequency channel from the base station.

18. The apparatus of claim 17, wherein the means for measuring uplink signal quality for each of the plurality of selected frequency channels and the means for measuring downlink signal quality for each of the plurality of selected frequency channels each comprise:

means for measuring the uplink bit error rate and measuring the downlink bit error rate for each of the selected frequency channels.

19. The apparatus of claim 17, wherein the means for identifying a candidate frequency channel comprises:

means for measuring uplink signal strength for each of a plurality of candidate frequency channels;

means for using the uplink signal measurement for each of the plurality of candidate frequency channels to identify a set of qualified candidate frequency channels; and means for identifying a qualified candidate frequency channel from the set of qualified candidate frequency channels.

20. The apparatus of claim 19, wherein the means for identifying a qualified candidate frequency channel from the set of qualified candidate frequency channels comprises:

means for comparing the uplink signal strength measurement for each qualified candidate frequency channel in the set of qualified candidate frequency channels; and means for selecting the qualified candidate frequency channel with a lowest signal strength.

21. The apparatus of claim 17, further comprising:

means for measuring uplink signal strength for each of the plurality of selected frequency channels;

means for measuring uplink signal strength for each of a plurality of candidate frequency channels;

means for using the uplink signal strength measurements for each of the plurality of selected frequency channels to choose a selected frequency channel;

means for using the uplink signal strength measurements for each of the plurality of candidate frequency channels to choose a qualified candidate frequency channel;

means for comparing the uplink signal strength measurement of the chosen selected frequency channel with the uplink signal strength measurement of the chosen qualified candidate frequency channel; and means for allocating the chosen qualified candidate frequency channel to the base station by exchanging the chosen selected frequency channel with the chosen qualified candidate frequency channel if the uplink signal strength measurement of the chosen selected frequency channel is greater than the uplink signal strength measurement of the chosen qualified candidate frequency channel by at least a third predefined amount.

22. The apparatus of claim 21, wherein the means for measuring the uplink signal strength for each of the plurality of selected frequency channels and the means for measuring the uplink signal strength for each of the plurality of candidate frequency channels each comprise the step of measuring interference signal levels.

23. The apparatus of claim 21, wherein the means for using the uplink signal strength measurements for each of the plurality of candidate frequency channels to choose a qualified candidate frequency channel comprises the steps of:
 means for using the uplink signal strength measurement for each of the plurality of candidate frequency channels to identify a set of qualified candidate frequency channels; and
 means for choosing one of the qualified candidate frequency channels from the set of qualified candidate frequency channels.

24. The apparatus of claim 23, wherein the means for choosing a qualified candidate frequency channel from the set of qualified candidate frequency channels comprises:
 means for comparing the uplink signal strength measurement for each qualified candidate frequency channel in the set of qualified candidate frequency channels with the uplink signal strength measurement of another qualified candidate frequency channel in the set of qualified candidate frequency channels; and
 means for choosing the qualified candidate frequency channel with a lowest signal strength measurement.

25. The apparatus of claim 21, wherein the means for using the uplink signal quality measurement for each of the plurality of selected frequency channels to choose a selected frequency channel comprises:
 means for comparing the uplink signal strength measurements for each of the plurality of selected frequency channels; and
 means for choosing the selected frequency channel with a highest signal strength measurement.

26. The apparatus of claim 19, wherein the means for using the uplink signal strength measurement for each of the plurality of candidate frequency channels to identify a set of qualified candidate frequency channels comprises:
 means for measuring downlink signal strength for each of the plurality of candidate frequency channels;
 means for using the uplink signal strength measurement for each of the plurality of candidate frequency channels and the downlink signal strength measurement for each of the plurality of candidate frequency channels to identify a set of qualified candidate frequency channels; and
 means for comparing the uplink signal strength measurement with the downlink signal strength measurement for each of the plurality of candidate frequency channels and designating a candidate frequency channel as a qualified candidate frequency channel only if the downlink signal strength measurement of the candidate frequency channel is not greater than the uplink signal strength measurement by more than a third predetermined amount.

27. The apparatus of claim 26, further comprising means for identifying a candidate frequency channel as a qualified candidate frequency channel only if a channel separation between the candidate frequency channel and a nearest selected frequency channel is greater than a predefined minimum channel separation requirement.

28. The apparatus of claim 27, further comprising means for identifying a candidate frequency channel as a qualified candidate frequency channel only if the candidate frequency channel, in combination with any of the plurality of selected frequency channels except the identified selected frequency channel, does not produce third order intermodulation products equivalent to any one of the plurality of selected frequency channels other than the identified selected frequency channel.

29. An apparatus for allocating a frequency channel to a base station in a telecommunications network, thereby making the frequency channel available for subsequent use by the base station regardless of whether the frequency channel is required for immediate assignment to a mobile call, said apparatus comprising:
 means for measuring uplink signal strength for each of a plurality of candidate frequency channels, wherein the plurality of candidate frequency channels is defined as a set of frequency channels that are not allocated to the base station;
 means for measuring downlink signal strength for each of said plurality of candidate frequency channels;
 means for choosing a qualified candidate frequency channel from the plurality of candidate frequency channels; and
 means for allocating the chosen qualified candidate frequency channel to the base station,
 wherein the means for choosing a qualified candidate frequency channel comprises:
  means for comparing the uplink signal strength measurement with the downlink signal strength measurement for each of the plurality of candidate frequency channels and designating a candidate frequency channel as a qualified candidate frequency channel only if the downlink signal strength measurement of the candidate frequency channel is not greater than the uplink signal strength measurement by more than a predetermined amount.

30. The apparatus of claim 29, further comprising means for identifying a candidate frequency channel as a qualified candidate frequency channel only if a channel separation between the candidate frequency channel and a nearest selected frequency channel is greater than a predefined minimum channel separation requirement.

31. The apparatus of claim 30, wherein said predefined minimum channel separation requirement is defined by a number of 30 KHz intervals separating a center frequency for each of two adjacent frequency channels.

32. The apparatus of claim 30, wherein the means for allocating the chosen qualified candidate frequency channel to a base station in the telecommunications network comprises:
 means for exchanging the chosen qualified candidate frequency channel with a selected frequency channel; and
 means for identifying a candidate frequency channel as a qualified candidate frequency channel only if the candidate frequency channel in combination with any of a plurality of selected frequency channels, except the selected frequency channel with which the qualified candidate frequency channel is to be exchanged, does not produce third order intermodulation products equivalent to any one of the plurality of selected frequency channels other than the selected frequency channel with which the qualified candidate frequency channel is to be exchanged.

* * * * *